US009474203B2

(12) United States Patent
Anderson et al.

(10) Patent No.: US 9,474,203 B2
(45) Date of Patent: Oct. 25, 2016

(54) GAUGE WHEEL FOR AN AGRICULTURAL IMPLEMENT

(71) Applicant: CNH Industrial America LLC, New Holland, PA (US)

(72) Inventors: Brian John Anderson, Yorkville, IL (US); Johnathon R. Dienst, Dekalb, IL (US)

(73) Assignee: CNH Industrial America LLC, New Holland, PA (US)

( * ) Notice: Subject to any disclaimer, the term of this patent is extended or adjusted under 35 U.S.C. 154(b) by 71 days.

(21) Appl. No.: 14/500,107

(22) Filed: Sep. 29, 2014

(65) Prior Publication Data
US 2016/0088789 A1   Mar. 31, 2016

(51) Int. Cl.
*A01C 7/20* (2006.01)
*A01C 5/06* (2006.01)

(52) U.S. Cl.
CPC ............... *A01C 7/203* (2013.01); *A01C 5/06* (2013.01); *B60B 2900/211* (2013.01)

(58) Field of Classification Search
CPC .. A01B 29/043; A01B 29/041; A01B 29/04; A01B 21/08; A01B 33/087; A01C 5/068; A01C 7/203; B60B 2900/211
USPC ...... 111/48.1, 135, 134, 137, 194, 195, 196; 172/610; 152/209.16, 209.23, 500
See application file for complete search history.

(56) References Cited

U.S. PATENT DOCUMENTS

| 391,045 A | * | 10/1888 | Hatch | B60B 15/02 |
| | | | | 301/43 |
| 4,694,872 A | | 9/1987 | Granryd | |
| 5,421,388 A | | 6/1995 | Bonko et al. | |
| 5,461,994 A | | 10/1995 | Zimmerman | |
| 5,509,363 A | | 4/1996 | Zimmerman | |
| 5,517,932 A | * | 5/1996 | Ott | A01C 5/068 |
| | | | | 111/166 |
| D386,191 S | * | 11/1997 | Bruns | D15/28 |
| 5,685,246 A | | 11/1997 | Zimmerman | |
| 5,896,932 A | | 4/1999 | Bruns et al. | |
| 5,970,891 A | | 10/1999 | Schlagel | |

(Continued)

FOREIGN PATENT DOCUMENTS

EP   1238824 A1 * 9/2002 ............ B60B 19/00

OTHER PUBLICATIONS

Reduced Inner Diameter Gauge Tires; http://www.cerealisprecisionsa.com/MartinTill01.html; p. 4, step 3; Jan. 12, 2011.

(Continued)

*Primary Examiner* — John G Weiss
(74) *Attorney, Agent, or Firm* — Rebecca L. Henkel (57) ABSTRACT

A gauge wheel for an agricultural implement includes a tire. The tire includes a first circumferential section forming an axially inward portion of the tire. The first circumferential section comprises a lip extending radially outward from the tire and having an axially inward end configured to contact an opener disc. The lip also includes an axially outward end. Also, at least one cutout extends axially between the axially inward end and the axially outward end of the lip. Moreover, the at least one cutout is configured to enable displaced soil to move from the axially inward end to the axially outward end of the lip. The tire also includes a second circumferential section extending from the first circumferential section at the axially outward end of the lip and forming an axially outward portion of the tire.

20 Claims, 4 Drawing Sheets

(56) References Cited

U.S. PATENT DOCUMENTS

| | | |
|---|---|---|
| 6,142,085 A | 11/2000 | Drever et al. |
| 6,347,594 B1 | 2/2002 | Wendling et al. |
| 7,143,704 B1 | 12/2006 | Gust et al. |
| 7,673,571 B2 | 3/2010 | Medernach |
| 7,856,934 B2 | 12/2010 | Hagny |
| 7,946,232 B2 | 5/2011 | Patwardhan et al. |
| 8,275,525 B2 | 9/2012 | Kowalchuk et al. |
| 8,356,564 B2 | 1/2013 | Breker et al. |
| 8,516,969 B2 | 8/2013 | Wendte et al. |
| 8,720,351 B1 * | 5/2014 | Wipf ........................ A01C 5/06 111/137 |
| 2011/0120356 A1 | 5/2011 | Wendte et al. |
| 2014/0262564 A1 | 9/2014 | Luker |
| 2016/0114623 A1 * | 4/2016 | Smith .................... B60B 21/125 301/11.1 |

OTHER PUBLICATIONS

Furrow Cruiser Wheels; http://www.shoupparts.com/CW1241/; p. 1; last accessed Sep. 29, 2014.

Side Treader Wheel; http://martintill.com/Instructions_Catalog/BD1360.pdf; p. 2; last accessed Sep. 29, 2014.

* cited by examiner

GAUGE WHEEL FOR AN AGRICULTURAL IMPLEMENT

BACKGROUND

The invention relates generally to agricultural implements, and more specifically, to a gauge wheel of an opener assembly of an agricultural implement.

Generally, planting implements (e.g., planters) are towed behind a tractor or other work vehicle via a mounting bracket secured to a rigid frame of the implement. These planting implements typically include multiple row units distributed across the width of the implement. Each row unit is configured to deposit seeds at a desired depth beneath the soil surface, thereby establishing rows of planted seeds. For example, each row unit may include an opener assembly having a ground engaging tool or opener (e.g., an opener disc) that forms a seeding path for seed deposition into the soil. In certain configurations, the opener assembly also includes a gauge wheel or wheels positioned a vertical distance above the opener to establish a desired furrow depth for seed deposition into the soil. As the implement travels across a field, the opener excavates a furrow (e.g., trench) into the soil, and seeds are deposited into the furrow. In certain row units, the opener assembly is followed by a closing device such as a set of closing discs or wheels that direct the soil back into the furrow and/or a packer wheel that packs the soil on top of the deposited seeds.

In certain planting implements, the opener assembly includes multiple opener discs that penetrate the soil to form the furrow. Moreover, the opener discs rotate as the row unit travels across the field, thereby excavating the furrow. As a speed of the row unit increases, a speed of rotation of the opener discs also increases. Consequently, the opener discs may throw soil away from the furrow. As a result, the effectiveness of the closing discs or wheels, which are configured to direct the soil back into the furrow to cover the seeds deposited in the furrow, may be reduced. Therefore, uneven seed covering may occur, resulting in non-optimal growing conditions for the seeds and, thereby, reducing overall crop yields.

BRIEF DESCRIPTION

In an embodiment, a gauge wheel for an agricultural implement includes a tire. The tire includes a first circumferential section forming an axially inward portion of the tire. In certain embodiments, the first circumferential section comprises a lip extending radially outward from the tire and having an axially inward end configured to contact an opener disc. The lip also includes an axially outward end. In certain embodiments, at least one cutout extends axially between the axially inward end and the axially outward end of the lip. Moreover, the at least one cutout is configured to enable displaced soil to move from the axially inward end to the axially outward end of the lip. The tire also includes a second circumferential section extending from the first circumferential section at the axially outward end of the lip and forming an axially outward portion of the tire.

In another embodiment a gauge wheel for an agricultural implement includes a tire. In certain embodiments, the tire includes a first circumferential section forming an axially inward portion of the tire and having a lip extending radially outward from the tire. The lip is configured to contact an opener disc of the agricultural implement. The tire also includes at least one cutout extending axially through the lip. The cutout is configured to enable displaced soil to move through the lip toward an axially outward portion of the tire. The tire further includes a second circumferential section extending from an axially outward end of the lip and forming the axially outward portion of the tire. In certain embodiments, the tire includes a recess formed by the lip and the second circumferential section on a radially outward facing surface of the tire. The recess is configured to receive the displaced soil.

In a further embodiment a gauge wheel for an agricultural implement includes a tire. The tire includes a first circumferential section forming an axially inward portion of the tire. The tire also includes a second circumferential section extending axially outward from the first circumferential section and forming an axially outward portion of the tire. In certain embodiments, the second circumferential section has a generally arcuate convex shape. The tire further includes a lip extending radially outward from the first circumferential section. The lip is configured to contact an opener disc of the agricultural implement. The tire also includes a plurality of cutouts extending axially through the lip along the axially inward portion to the axially outward portion.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The embodiments discussed herein relate to a hybrid gauge wheel for controlling opener penetration depth, maintaining displaced soil proximate to a furrow formed by the opener, and reducing soil compaction. The hybrid gauge wheel includes a tire having a first circumferential section having a lip configured to maintain the soil proximate to the furrow. That is, the lip is configured to collect and maintain displaced soil proximate to the furrow for subsequent disposition into the furrow by a closing disc and/or gauge wheel. In some embodiments, the tire includes a second circumferential section extending from the first circumferential section. The first and section circumferential sections form a pocket configured to control the soil and block movement of the soil away from the furrow. The tire of the hybrid gauge wheel also includes cutouts extending through the lip. The cutouts provide paths for soil to escape the pocket, thus reducing sidewall pressure and soil compaction. In some embodiments, the cutouts are equally spaced about the circumference of the gauge wheel. However, in alternative embodiments, the cutouts may be spaced at various positions to account for soil conditions. Moreover, the size and shape of the cutouts may be particularly selected to accommodate soil conditions.

Figure 1:
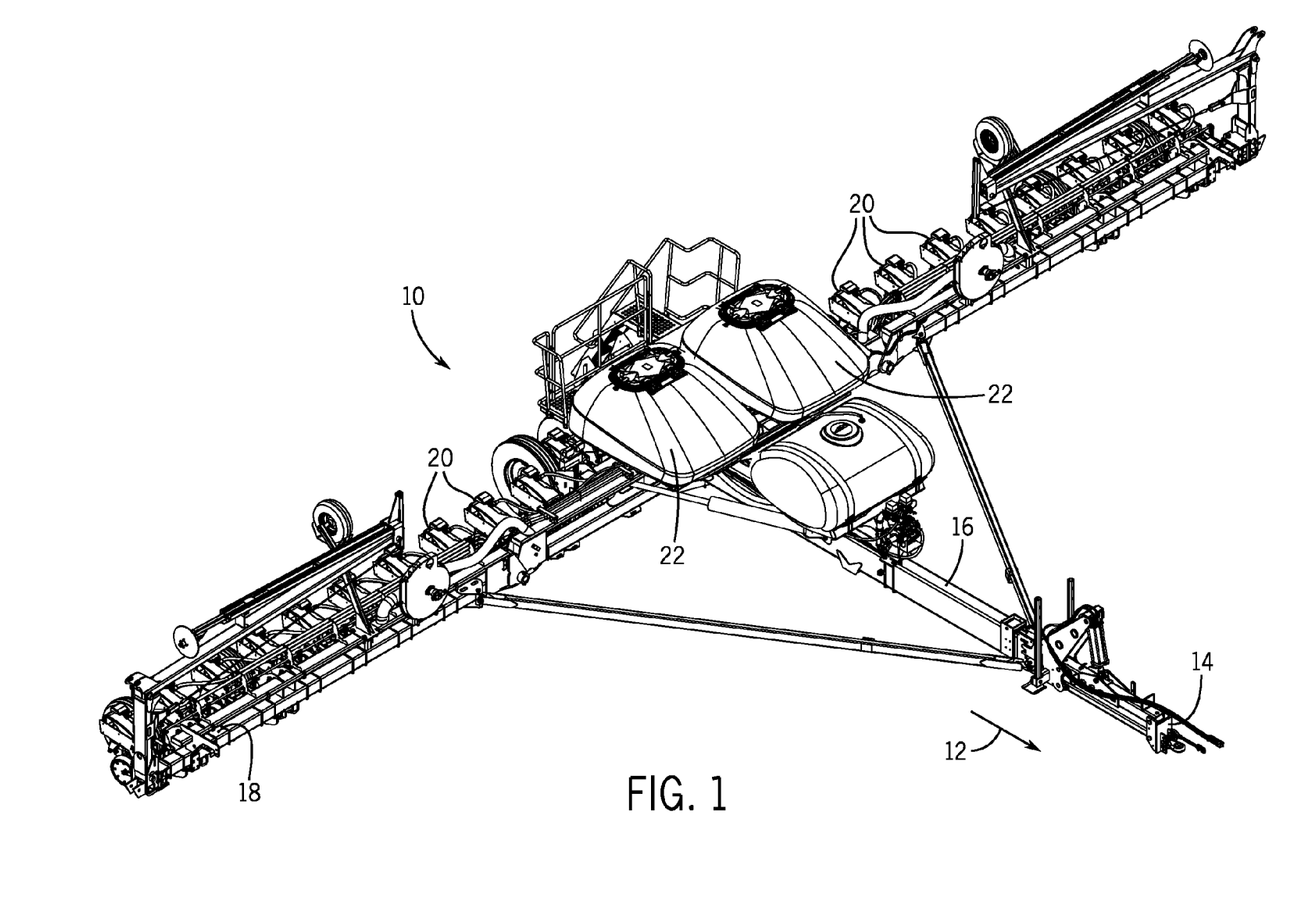
FIG. 1 is a perspective view of an embodiment of an agricultural implement configured to deposit seeds into a soil surface.

FIG. 1 is a perspective view of an embodiment of an agricultural implement 10 configured to deposit seeds into a soil surface. In the illustrated embodiment, the implement 10 is configured to be towed along a direction of travel 12 by a work vehicle, such as a tractor or other prime mover. The work vehicle may be coupled to the implement 10 by a hitch assembly 14. As illustrated, the hitch assembly 14 is coupled to a main frame assembly 16 of the implement 10 to facilitate towing of the implement 10 in the direction of travel 12. In the illustrated embodiment, the frame assembly 16 is coupled to a tool bar 18 that supports multiple row units 20. Each row unit 20 is configured to deposit seeds at a desired depth beneath the soil surface, thereby establishing rows of planted seeds. The implement 10 also includes seed tanks 22 and a pneumatic distribution system configured to convey seeds from the tanks to the row units 20. In certain embodiments, the pneumatic distribution system includes an inductor box positioned beneath each seed tank 22. Each inductor box is configured to receive seeds from a respective tank, to fluidize the seeds into an air/seed mixture, and to distribute the air/seed mixture to the row units 20 via a network of pneumatic hoses/conduits.

In certain embodiments, each row unit 20 includes a row unit attachment, an opening assembly, a seed tube, a closing assembly, and a press wheel. The row unit attachment may include a rotating wheel having multiple tillage points or fingers that break up or remove crop residue, thereby preparing the soil for seed deposition. Moreover, the row unit attachment may include a pair of discs used to clear a path of material such as dirt clods or rocks. The opening assembly includes one or more gauge wheels and one or more opener discs. The gauge wheel may be positioned a vertical distance above the opener disc to establish a desired furrow depth for seed deposition into the soil. The closing assembly includes a pair of closing discs or wheels. As the row unit travels across a field, the opener disc excavates a furrow into the soil for seed deposition. The seed tube, which may be positioned behind the opening assembly, directs a seed from a metering system into the excavated furrow. The closing discs or wheels then direct the excavated soil into the furrow to cover the planted seed. Finally, the press wheel packs the soil on top of the seed with a desired pressure.

While the illustrated implement 10 includes 24 row units 20, it should be appreciated that alternative implements may include more or fewer row units 20. For example, certain implements 10 may include between 4, 6, 8, 12, 16, 24, 32, 36, or 54 row units, or more. In addition, the spacing between row units 20 may be particularly selected based on the type of crop being planted. For example, the row units 20 may be spaced 30 inches from one another for planting corn, and 15 inches from one another for planting soy beans.

In certain embodiments, gauge wheels are positioned adjacent to the opener discs. The gauge wheels are configured to control soil displaced by the opener discs near the furrows. In the illustrated embodiment, the gauge wheels are hybrid gauge wheels having cutouts disposed along an inner axial end of the gauge wheel. As will be discussed in detail below, the hybrid gauge wheel includes a lip placed adjacent to the furrow. The lip directs the soil toward a recess configured to control the soil. However, the cutouts are configured to release the soil from the recess, thereby reducing sidewall pressure and soil compaction.

Figure 2:
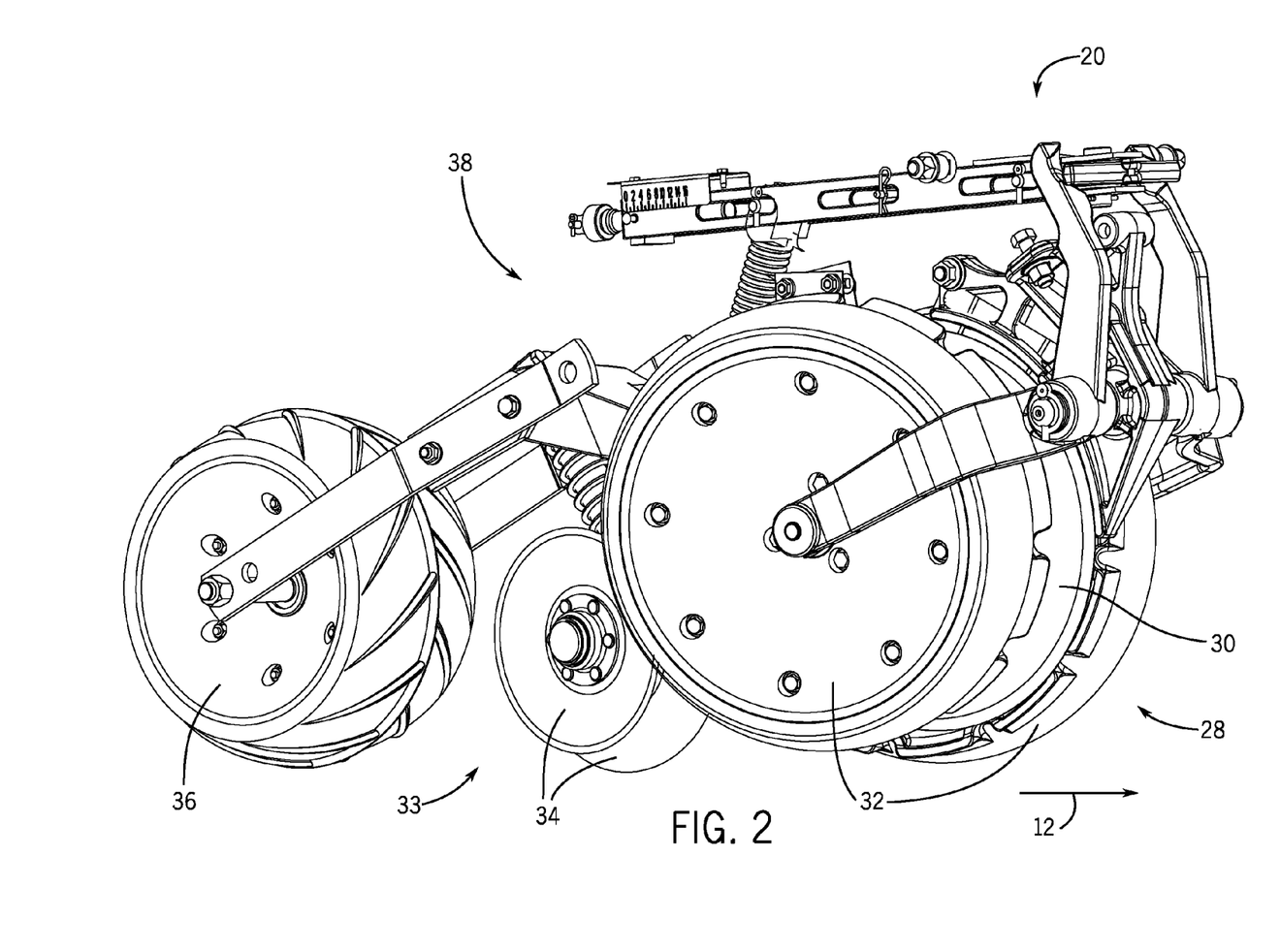
FIG. 2 is a perspective view of an embodiment of a row unit, which may be used in the agricultural implement of FIG. 1, having an opener assembly with gauge wheels disposed adjacent to opener discs.

FIG. 2 is a perspective view of an embodiment of a row unit 20 having an opener assembly with gauge wheels disposed adjacent to opener discs. The row unit 20 includes multiple components that facilitate planting operations. Specifically, the row unit 20 includes an opener assembly 28 having a pair of opener discs 30 (e.g., openers) that rotate into soil as the row unit 20 travels across a field to form a furrow for planting seeds. A set of gauge wheels 32 (e.g., hybrid gauge wheels) may be used to set a depth that the opener discs 30 extend into the soil. The depth set by the gauge wheels 32 may be selected by an operator, such that the furrow depth resulting from rotation of the opener discs 30 is adjustable. For example, certain seeds may be planted deep into soil to facilitate enhanced plant growth, thereby using a deep furrow. Conversely, other seeds may be planted shallow into soil to facilitate enhanced plant growth, thereby using a shallow furrow.

Once the seeds are deposited in the furrow, a closing assembly 33 may redirect the removed soil back into the furrow to cover the seeds. As illustrated, the closing assembly 33 includes closing discs 34 disposed rearwardly from the gauge wheels 32 relative to the direction of travel 12. The closing discs 34 are positioned to direct soil back into the furrow to cover the seeds. Furthermore, a packing wheel 36 may follow the closing discs 34 to compact the soil onto the seeds.

In certain embodiments, portions of the opener discs 30 may be in physical contact with the gauge wheels 32. Accordingly, the gauge wheels 32 may scrape soil off the opener discs 30 to reduce soil build-up and/or to enable the furrow to be consistently formed. The opener discs 30, the gauge wheels 32, the closing discs 34, and the packing wheel 36 are coupled to a frame assembly 38 of the row unit 20.

Figure 3:
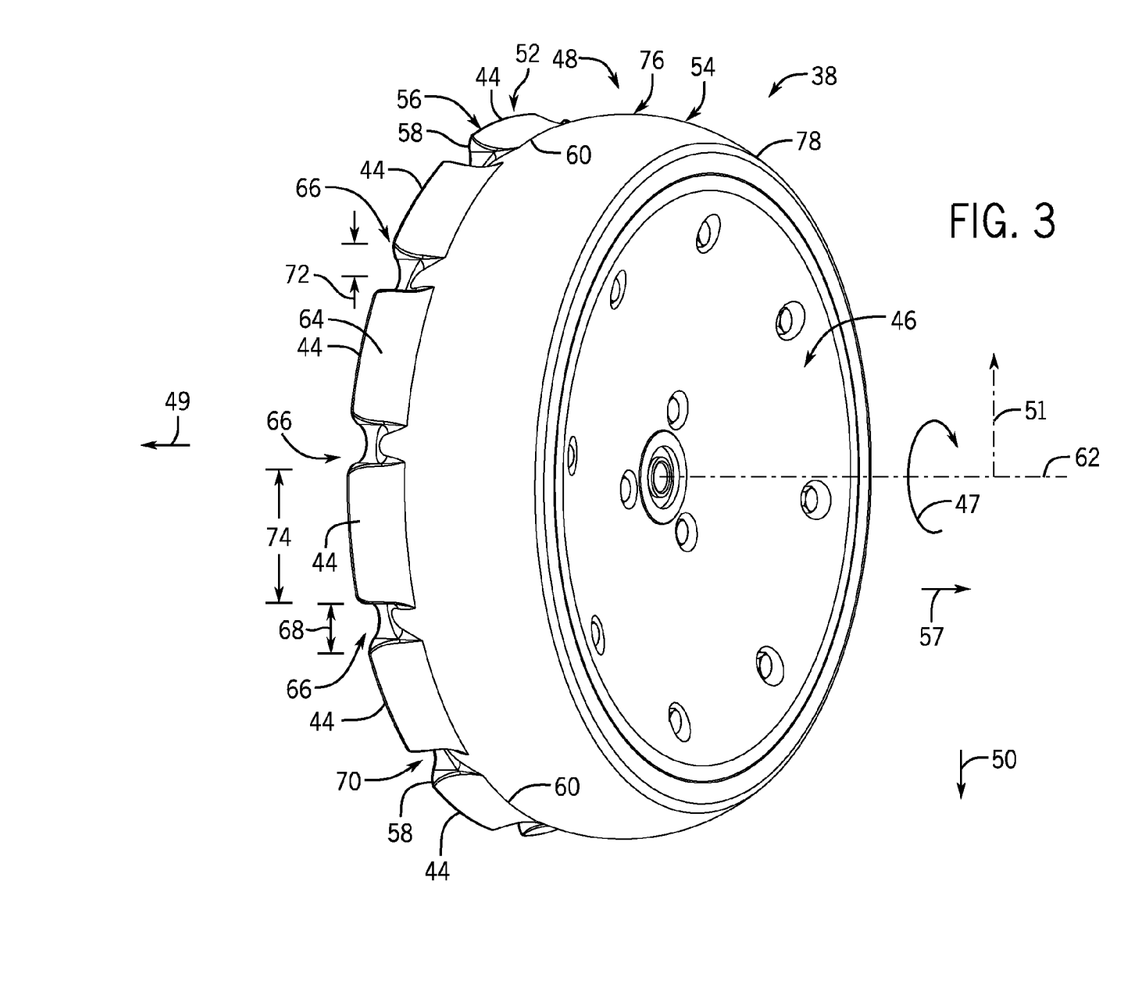
FIG. 3 is a perspective view of an embodiment of a hybrid gauge wheel, which may be used in the row unit of FIG. 2.

FIG. 3 is a perspective view of the hybrid gauge wheel 32. As mentioned above, the hybrid gauge wheel 32 is configured to block displaced soil from moving away from the furrow formed by the openers 30 while relieving sidewall pressure and reducing compaction. In the illustrated embodiment, the hybrid gauge wheel 32 includes a hub 46 circumferentially surrounded by a tire 48 about a circumferential axis 47. The tire 48 is formed from a resilient material (e.g., rubber, polybutadiene, styrene-butadiene, or the like) and surrounds an outer circumference of the hub 46, in the illustrated embodiment. However, in other embodiments, the tire 48 may be formed from other materials such as metals or the like. In certain embodiments, the tire 48 is a solid structure that conforms to the hub 46 and is configured to apply a force against the soil surface in a downward direction 50 along a radial axis 51. However, in other embodiments, the tire 48 may include a hollow, inflatable portion configured to receive compressed gases (e.g., air, nitrogen, etc.) to create a cushion between the tire 48 and the hub 46. For example, the tire 48 may include interior ridges that press against the hub 46 when an interior space between the tire 48 and the hub 46 is filled with compressed gas.

As shown in FIG. 3, the tire 48 includes a first circumferential section 52 and a second circumferential section 54. The first circumferential section 52 forms an axially inward portion of the tire 48 proximate to the opener 30. As used herein, axially inward refers to the portion of the gauge wheel 32 closer to the opener disc 30 and/or in the axially inward direction 49. In the illustrated embodiment, the first section 52 includes a lip 56 extending radially outward from the tire 48 (e.g., relative to the radial axis 51). In certain embodiments, the lip 56 is configured to contact the opening discs 30. Moreover, in certain embodiments, the axially inward portion of the tire 48 and/or the lip 56 may be substantially flat. In addition, a first axial end 58 of the lip 56 is farther from an axial axis 62 than a second axial end 60 of the lip 56 (e.g., along the radial axis 51), thereby forming the lip 56 that is downward along an axially outward direction 57. As used herein, axially outward refers to the portion of the gauge wheel 32 furthest from the opener disc 30 and/or in the actually outward direction 57. Moreover, a radially outward surface 64 of the lip 56 extends between the first axial end 58 and the second axial end 60. As shown, the radially outward surface 64 is arcuate, but in other embodiments the radially outward surface 64 may be straight or another suitable shape. The lip 56 is configured to maintain displaced soil adjacent to the furrow. That is, the arcuate radially outward surface 64 of the lip 56, in conjunction with a radially outward surface of the second section 54, keeps the soil proximate to the furrow as the hybrid gauge wheel 32 travels along the agricultural field (e.g., via rotation of the gauge wheel 32 about the axial axis 62).

In the illustrated embodiment, lip 56 includes cutouts 66 aligned with the axial axis 62. As shown, the cutouts 66 extend axially through the lip 56, forming lip segments 44, along the circumferential axis 47 of the hybrid gauge wheel 32. In the illustrated embodiment, the lip 56 is integrally formed to the first section 52 of the tire 48. However, in other embodiments, the lip segments 44 may be independent features configured to couple to the tire 48 about the circumferential axis 47. In certain embodiments, the cutouts 66 are evenly spaced around the circumference of the hybrid gauge wheel 32. However, in other embodiments, the spacing between the cutouts 66 may be particularly selected for expected soil conditions. For example, certain cutouts 66 may be closer to one another, as compared to other cutouts, at certain locations about the circumference of the hybrid gauge wheel 32 to reduce clumping in moist soil. Moreover, a cutout width 68 (e.g., circumferential extent of the cutout 66 about the circumferential axis 47) may be particularly selected based on soil conditions. In certain embodiments, the cutout width 68 may be 1% of the tire 48 circumference, 2% of the tire 48 circumference, 3% of the tire 48 circumference, 4% of the tire 48 circumference, 5% of the tire 48 circumference, 10% of the tire 48 circumference, or any suitable width to account for soil conditions. For instance, the cutout width 68 may be smaller for loosely packed soil, and larger for densely packed soils. In the illustrated embodiment, the width 68 of the cutouts 66 is less than a width 74 of the lip segments 44. However, in alternative embodiments, the width 68 may be greater than or equal to the width 74 of the lip segments 44. Moreover, in certain embodiments, each cutout 66 or certain cutouts 66 may have different widths 68.

The cutouts 66 are configured to direct soil away from the furrow (e.g., in the axially outward direction 57) and a sidewall 70 of the hybrid gauge wheel 32. That is, the cutouts 66 enable intermittent release of soil pressure. For instance, soil may build up around the sidewall 70 due to the lip 56. As soil pressure increases (e.g., as soil builds up on the gauge wheel 32 as the implement 10 moves through the field), the soil is directed toward the cutouts 66 and into a recess on the outer circumferential surface of the tire. As a result, sidewall pressure is reduced, and soil compaction may be reduced while providing control of the soil near the furrow.

As mentioned above, the spacing of the cutouts 66 may be particularly selected to accommodate different soil types. Moreover, the cross-sectional shape of the cutouts 66 may be particularly selected for different planting conditions. In the illustrated embodiment, the cross-sectional shape is substantially U-shaped. However, in certain embodiments, the cross-sectional shape of the cutouts 66 may be generally arcuate, triangular, rectangular, circular, or the like. It will be appreciated that differently shaped cutouts 66 may be used for different planting conditions (e.g., moisture content of the soil, soil compaction, etc.). In certain embodiments, each cutout 66 has the same cross-sectional shape. However, in other embodiments, certain cutouts 66 may have different cross-sectional shapes. For instance, one set of cutouts 66 may be rectangular while another set of cutouts 66 is arcuate. Moreover, in some embodiments, the cuts outs 66 may include combinations of cross-sectional shapes. For example, the cutouts 66 may be generally U-shaped with arcuate edges.

Furthermore, a cutout depth 72 (e.g., a radial extent of the cutout 66 relative to the radial axis 51) may be particularly selected based on anticipated soil conditions. As shown in FIG. 3, the cutout depth 72 establishes portions of the tire 48 having a reduced diameter on an axially inner side of the hybrid gauge wheel 32. For example, in the illustrated embodiment, the cutout depth 72 is approximately 1% of the circumference of the tire 48. However, in other embodiments, the cutout depth 72 may be a half percent of the circumference of the tire 48, 2% of the circumference of the tire 48, 3% of the circumference of the tire 48, 4% of the circumference of the tire 48, 5% of the circumference of the tire 48, 10% of the circumference of the tire 48, or any suitable depth to account for anticipated soil conditions. Moreover, in certain embodiments, the cutout depth 72 may vary about the circumference of the hybrid gauge wheel 32. For example, certain cutouts 66 may have different depths than other cutouts 66 (e.g., the cutout depth 72 of one cutout 66 may be 1% of the circumference of the tire 48 while an adjacent cutout 66 may have the cutout depth 72 of 2% of the circumference of the tire 48). It will be appreciated that the cutout depth 72 may be particularly selected to account for soil conditions.

As described above, the cutouts 66 may be particularly selected to account for soil conditions. For example, the spacing of the cutouts 66 may be a particularly selected. In the illustrated embodiment, the cutouts 66 are evenly spaced along the circumference of the hybrid gauge wheel 32. However, in certain embodiments, the cutouts 66 may not be evenly spaced around the circumference of the hybrid gauge wheel 32. For example, one half of the hybrid gauge wheel 32 may have more cutouts 66 than the other half of the hybrid gauge wheel 32. Similarly, the number of cutouts 66 may be particularly selected. That is, for different soil conditions a different number of cutouts 66 may lead to improved control of the soil.

In the illustrated embodiment, the second circumferential section 54 of the tire 48 is configured to control the soil as the hybrid gauge wheel 32 travels through the agricultural field. That is, the second section 54 is configured to block the soil from moving away from the furrow. As a result, the closing discs 34 and/or the packing wheel 36 may close the furrow with a desired amount of soil because the soil is not lost (e.g., displaced beyond the range of the closing discs 34/packing wheel 36) as the implement 10 travels through the field. In other words, by blocking movement of the displaced soil away from the furrow, the gauge wheel 32 enables the closing discs 34 to replace a substantial portion of the soil that was removed to create the furrow. The second circumferential section 54 is generally arcuate in the illustrated embodiment. As illustrated, the second circumferential section 54 includes an apex 76 that is farther away from the axial axis 62 than the outer edge 78. To this end, the hybrid gauge wheel 32 is configured to contact the soil at the apex 76. As will be described below, the shape of the second circumferential section 54 is configured to create a pocket to hold and control the soil.

Figure 4:
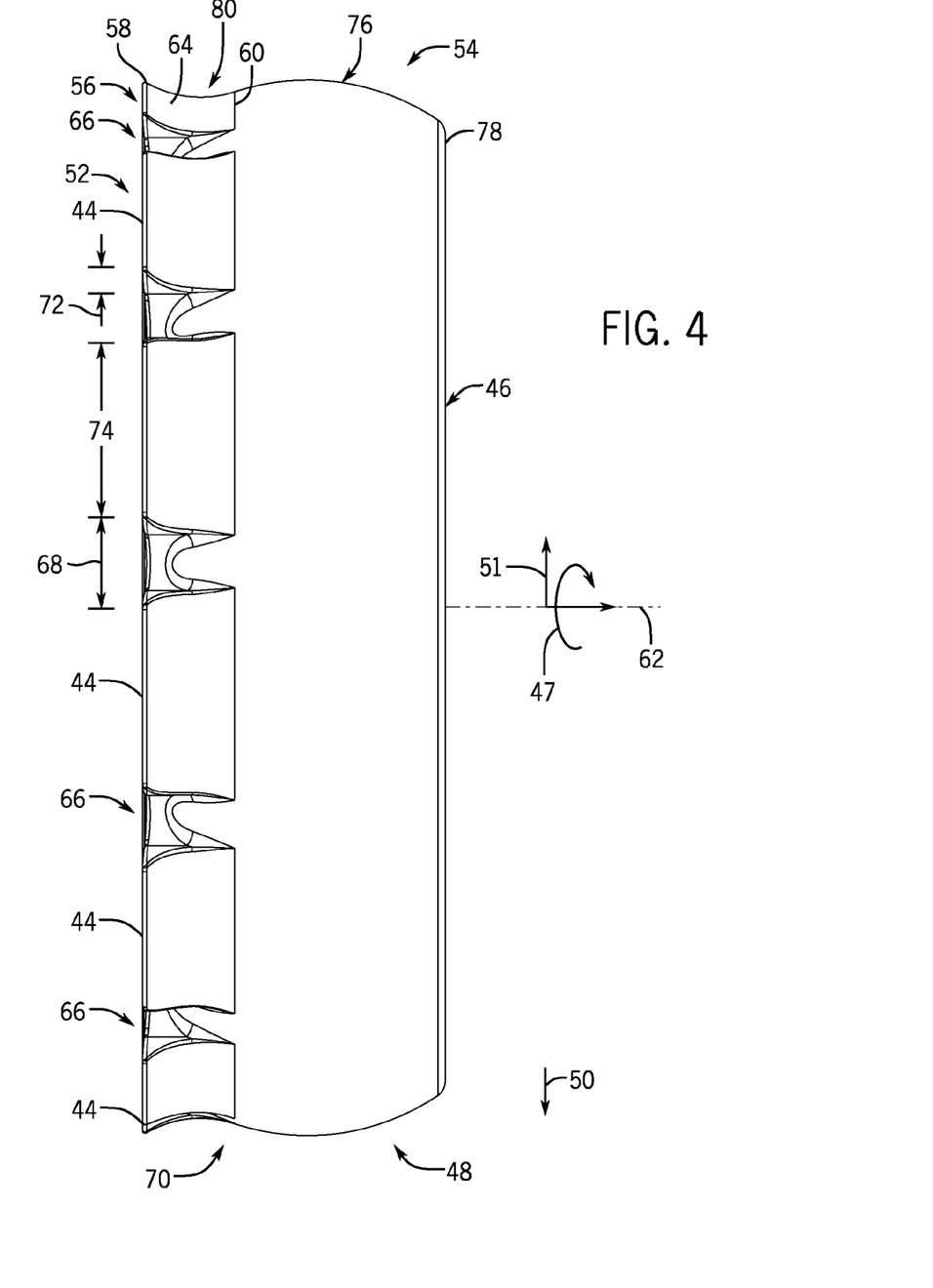
FIG. 4 is a side view of the hybrid gauge wheel of FIG. 3.

FIG. 4 is a side view of the hybrid gauge wheel 32 of FIG. 3. As described above, the lip 56 is tapered and/or sloped such that the first axial end 58 is farther from the axial axis 62 than the second axial end 60. As illustrated, the lip 56 and the second circumferential section 54 create a recess 80 to receive and control soil as the hybrid gauge wheel 32 travels along the agricultural field. In the illustrated embodiment, the first axial end 58 of the lip 56 is approximately the same distance from the axial axis 62 as the apex 76 of the second section 54. However, in other embodiments, the first axial end 58 may be closer to or farther from the axis 62, as determined based on conditions, for example soil moisture content.

Furthermore, as discussed above, the cutouts 66 are generally U-shaped, in the illustrated embodiment. To this end, soil is directed away from the recess 80 (e.g., away from the furrow) to reduce side wall 70 pressure and compaction. However, the recess 80 is configured to retain a portion of the soil and to block the portion of soil from moving away from the furrow created by the opener 30.

As described in detail above, the illustrated embodiments describe the hybrid gauge wheel 32 configured to control the soil removed from furrows while reducing sidewall pressure and soil compaction. For example, the hybrid gauge wheel 32 includes a first axial section 52 having the lip 56 and cutouts 66 configured to engage the soil of the agricultural field. The lip 56 and the second axial section 54 maintain the soil near the furrow while the cutouts 66 provide paths for the soil to flow away from the sidewall 70 to reduce compaction of the soil. To this end, soil is controlled and kept near the furrow by the recess 80 while maintaining a path to release soil pressure.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A gauge wheel for an agricultural implement, comprising:
a tire, comprising:
a first circumferential section forming an axially inward portion of the tire, wherein the first circumferential section comprises a lip extending radially outward from the tire and having an axially inward end configured to contact an opener disc and an axially outward end, at least one cutout extends axially between the axially inward end and the axially outward end of the lip forming respective lip segments, the at least one cutout is configured to enable displaced soil to move from the axially inward end to the axially outward end of the lip, and radial profiles of the respective lip segments are substantially the same as one another; and
a second circumferential section extending from the first circumferential section at the axially outward end of the lip and forming an axially outward portion of the tire.

2. The gauge wheel of claim 1, wherein the at least one cutout comprises a plurality of cutouts spaced at substantially equal distances from one another about a circumference of the tire.

3. The gauge wheel of claim 1, wherein the at least one cutout includes a generally U-shaped cross-section.

4. The gauge wheel of claim 1, comprising a hub coupled to an inner circumference of the tire and configured to couple the gauge wheel to an agricultural implement.

5. The gauge wheel of claim 1, wherein the lip includes a recess formed on a radially outward facing surface of the lip between the axially outward end and the axially inward end of the lip, wherein the recess is configured to receive the displaced soil.

6. The gauge wheel of claim 1, wherein a radially outward facing surface of the second circumferential section forms a substantially arcuate convex shape.

7. The gauge wheel of claim 1, wherein a circumferential extent of the cutout is between one to ten percent of a circumference of the tire.

8. The gauge wheel of claim 1, wherein a radial extent of the cutout is between one to ten percent of a diameter of the tire.

9. A gauge wheel for an agricultural implement, comprising:
a tire comprising:
a first circumferential section forming an axially inward portion of the tire and having a lip extending radially outward from the tire, wherein an axially inward end of the lip corresponds to a maximum extent of the gauge wheel in an axially inward direction, and the lip is configured to contact an opener disc of the agricultural implement;
at least one cutout extending axially through the lip, wherein the cutout is configured to enable displaced soil to move through the lip toward an axially outward portion of the tire;
a second circumferential section extending from an axially outward end of the lip and forming the axially outward portion of the tire; and
a recess formed by the lip and the second circumferential section on a radially outward facing surface of the tire, wherein the recess is configured to receive the displaced soil.

10. The gauge wheel of claim 9, wherein the axially inward end of the lip extends radially farther from the axial axis than the axially outward end.

11. The gauge wheel of claim 10, wherein a radially outward facing surface of the second circumferential section forms a substantially arcuate convex shape.

12. The gauge wheel of claim 9, comprising a hub coupled to an inner circumference of the tire and configured to couple the gauge wheel to an agricultural implement.

13. The gauge wheel of claim 9, wherein the at least one cutout comprises a plurality of cutouts spaced at substantially equal distances from one another about a circumference of the tire.

14. The gauge wheel of claim 13, wherein each cutout of the plurality of cutouts is substantially the same size and the same shape.

15. The gauge wheel of claim 13, wherein the plurality of cutouts have a generally U-shaped cross-section.

16. A gauge wheel for an agricultural implement, comprising:
   a tire, comprising:
      a first circumferential section forming an axially inward portion of the tire;
      a second circumferential section extending axially outward from the first circumferential section and forming an axially outward portion of the tire, wherein a radially outward facing surface of the second circumferential section has a generally arcuate convex shape;
   a lip extending radially outward from only the first circumferential section, wherein an axially inward end of the lip corresponds to a maximum extent of the gauge wheel in an axially inward direction, and the lip is configured to contact an opener disc of the agricultural implement; and
   a plurality of cutouts extending axially through the lip along the axially inward portion to the axially outward portion.

17. The gauge wheel of claim 16, wherein the plurality of cutouts are spaced at substantially equal distances from one another about a circumference of the tire.

18. The gauge wheel of claim 16, wherein each cutout of the plurality of cutouts is configured to enable displaced soil to move from the axially inward end to an axially outward end of the lip.

19. The gauge wheel of claim 16, wherein the lip includes a recess formed on a radially outward facing surface of the lip between the axially inward end and an axially outward end of the lip, wherein the recess is configured to receive displaced soil.

20. The gauge wheel of claim 16, wherein a cross-section of at least one cutout of the plurality of cutouts is substantially U-shaped.

* * * * *